Figure 1:
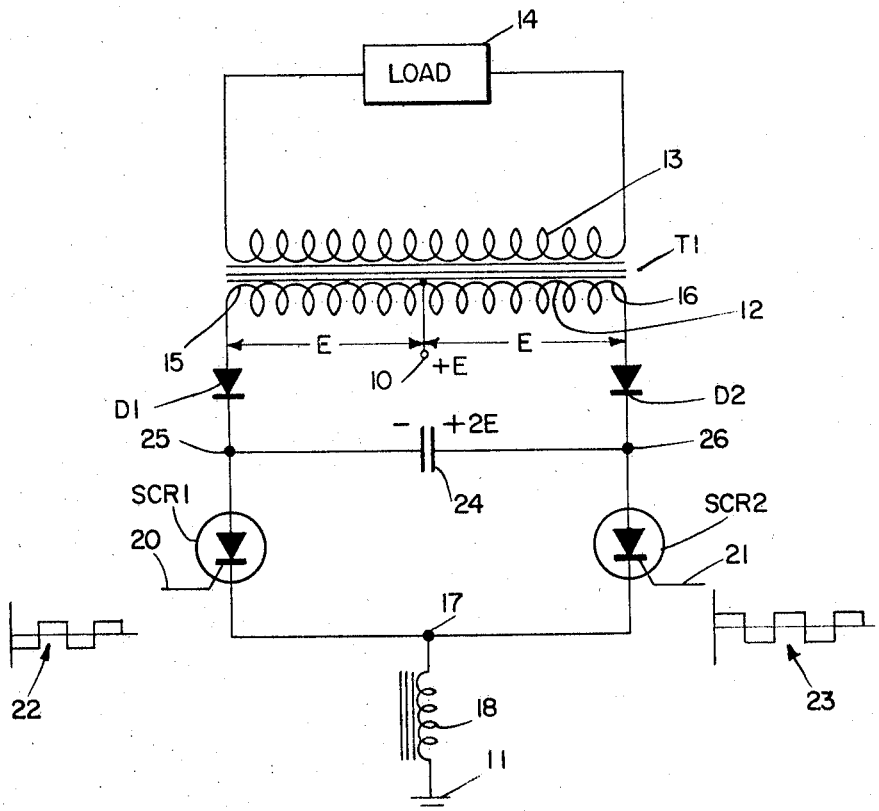

INVENTOR.
ROBERT R. SMYTH
ATTORNEY

{ # United States Patent Office

3,424,973
Patented Jan. 28, 1969

3,424,973
ELECTRICAL INVERTERS
Robert R. Smyth, Lincoln, Mass., assignor to Technical Operations Incorporated, Burlington, Mass., a corporation of Delaware
Filed Mar. 19, 1962, Ser. No. 180,561
U.S. Cl. 321—45    6 Claims
Int. Cl. H02m 7/44

This invention relates to electrical inverters, and more particularly to such inverters of the type, sometimes called "parallel inverters," employing solid state controlled rectifiers in full-wave pairs. The solid state controlled rectifier is, at the present time, exemplified by the silicon controlled rectifier, conveniently referred to as "SCR."

It is an object of the invention to improve the operation of full wave solid state inverters. Another object is to provide simplified full wave solid state inverters with improved latitude of control.

The parallel inverter is characterized by a pair of rectifying circuits connected in parallel across a DC source, the circuits being provided with switching means to render them alternately conductive and nonconductive, respectively, and means coupled to each circuit to derive therefrom an alternating electrical output. In more modern full-wave rectifiers employing solid state rectifiers, such as silicon controlled rectifiers (SCR), a commutating capacitor is employed to provide reverse bias alternately for each rectifier to enable it to recover to the blocking state.

In prior-known parallel inverters of the type employing a center-tapped primary winding of a transformer through which to supply raw DC to the parallel branches containing solid state rectifiers and having a commutating capacitor across the primary winding, I have observed that for a variety of reasons it is possible for the voltage developed across the transformer to "sag" at the end of each half-cycle of the output frequency. This may occur either because of the peak load effects or because of transformer saturation; the latter is especially likely to occur during starting periods. If such "sag" occurs, the voltage across the commutating capacitor will decrease correspondingly, and commutation energy, which depends on the magnitude of stored charge on the commutating capacitor, will be reduced. This reduces the maximum current which can be commutated. It is a specific object of this invention to reduce the effect of the transformer voltage "sag" at the end of each half cycle. Another object is to provide means to maintain the commutating capacitor charged to its peak voltage independent of the wave form across the transformer primary winding after the initial switching interval. Still another, related, object is to maximize the current which can be commutated in a parallel inverter using solid state rectifiers.

Parallel inverters heretofore known possess limited flexibility of output and operation. Thus, in known silicon controlled rectifier type parallel inverters, the trigger arrangements now available may control the output frequency, but the energy content of each half cycle is substantially fixed by the supply voltage, load and circuit elements. The latter, in turn, are specified somewhat rigidly by the requirements for transient response in the switching functions. Thus, it has been usual to provide an inductor in series with the DC source, employing its transient characteristics to aid in the switching from one parallel branch to the other. Also, the size of the commutating capacitor has been specified by the turn-off characteristics of the controlled rectifiers, and the current to be commutated.

Additional objects of the invention are to provide improved inverter circuit means whereby the energy content of each half cycle of the output energy may be controlled independently of the output frequencly, to improve the utility of the commutating capacitor, and to eliminate the need for an inductor in the switching function.

According to the present invention, additional rectifier means are provided in each rectifier circuit, between the ends of the transformer primary winding and the commutating capacitor, and these cause the commutating capacitor to charge and remain charged to the peak voltage applied across it during each output half cycle.

In one of its specific aspects, the invention employs silicon controlled rectifiers as the additional rectifiers, and these enable the inverter to be triggered in such a fashion that the energy content of each half cycle of the output wave can be controlled. In such embodiments of the invention the inductor which has heretofore been employed to assist in the commutating function may be omitted.

Figure 2:
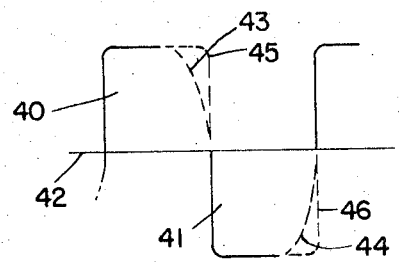
Figure 3:
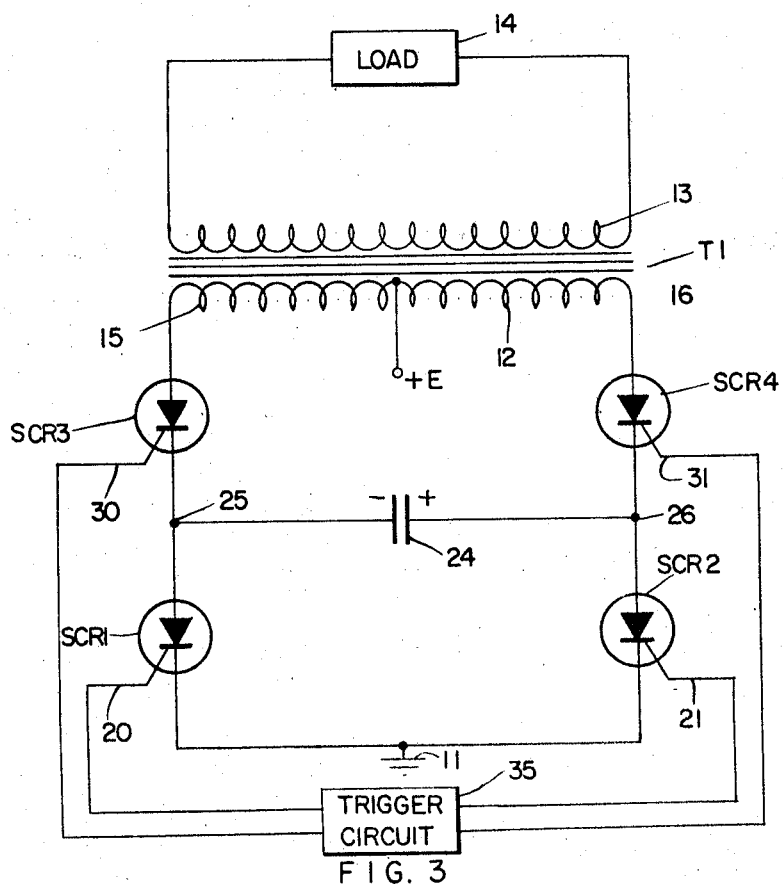
Figure 4:
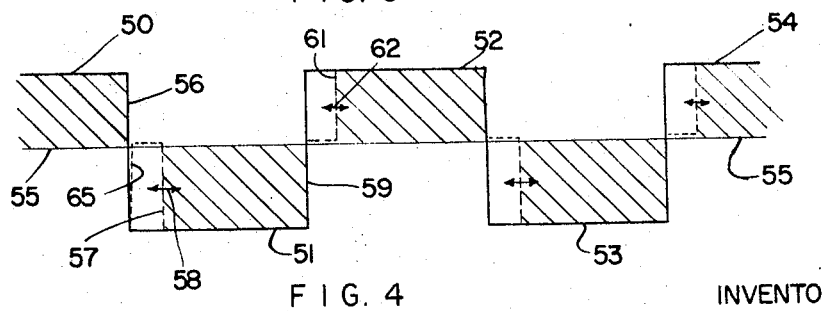

The foregoing and other objects and features of the invention will become apparent from the following description of some embodiments thereof. This description refers to the accompanying drawings, wherein:

FIG. 1 is a schematic diagram of an embodiment of the invention;
FIG. 2 illustrates a typical output wave form;
FIG. 3 is a schematic diagram of another embodiment of the invention; and
FIG. 4 illustrates the nature of the output wave form obtainable from the embodiment of FIG. 3.

FIG. 1 shows a full-wave parallel inverter circuit connected across a DC supply represented by a positive terminal 10, at a voltage+E, and ground 11. The positive terminal 10 is connected to the center of the primary winding 12 of a transformer T1. The secondary winding 13 is connected across a load 14. A first silicon controlled rectifier SCR1 is connected in series with a first diode D1 between one end 15 of the primary winding 12, and one end 17 of an inductor 18, and a second silicon controlled rectifier SCR2 is connected in series with a second diode D2 between the remaining end 16 of the primary winding 12 and the same end 17 of the inductor 18. The inductor 18 is connected between the cathodes of both of the silicon controlled rectifiers SCR1 and SCR2, and ground 11. The control electrodes or gates 20 and 21, respectively, of the silicon controlled rectifiers SCR1 and SCR2 are available for the application of control signals, represented at 22 and 23, respectively. These signals are applied, respectively, between the trigger electrode and the cathode of each SCR. A commutating capacitor 24 is connected between the junction 25 of the first diode D1 and first silicon controlled rectifier SCR1, and the junction 26 of the second diode D2 and second silicon controlled rectifier SCR2.

In operation, control signals 22 and 23, comprising alternating voltages which are mutually out of phase, are applied, respectively, to the gates 20 and 21, respectively. The control signals may be square waves, as illustrated, or they may be sine waves or other suitable control signals for alternately triggering the silicon controlled rectifiers, SCR1 and SCR2.

Assume we view the operation initially during a first output half cycle when SCR1 is conducting and SCR2 is blocking. The current from the DC positive terminal 10 will then be flowing through the left hand side of the primary winding 12 of the transformer T1, diode D1, SCR1, and choke 18 to ground 11. The current flowing through the primary winding 12 will, by transformer action, produce a voltage of +2E plus an overshoot due to the leakage reactance of the circuitry at the right-hand end 16 of the primary winding 12. In a typical case, this overshoot may carry the peak voltage thus produced to 2½ to 3 times the DC supply voltage. Diode D2 will cause condenser 24 to charge and remain charged to this peak voltage, with the polarity shown in FIG. 1. If for any
} reason during the first half cycle the voltage on the right-hand end 16 of the transformer primary winding 12 drops below this peak voltage, diode D2 will disconect the commutating capacitor 24, leaving it charged to the peak voltage. When, at the end of the first half cycle, a positive trigger pulse is applied to the gate 21 of SCR2, the latter controlled rectifier will turn on. When this happens, the upper end 17 of the inductor 18 which is connected to the SCR cathodes will be connected through SCR2 to the right-hand or positively charged side of the commutating capacitor 24. Provided sufficient charge has been stored in the commutating capacitor 24, the voltage across the commutating capacitor (i.e., the "commutating voltage") can maintain a reverse bias on SCR1 long enough to cause it to shut off. The commutating voltage (less the drop through SCR2) simultaneously appears at the upper end 17 of the inductor 18, which has a value of inductance such that this voltage will not decay (i.e., the charge stored in the commutating capacitor 24 cannot be discharged through the inductor 18) until sufficient time has passed for SCR1 to recover its blocking ability.

As the commutating capacitor 24 discharges through the inductor 18 the voltage at the upper end 17 of the inductor will drop down essentially to the negative DC input voltage (here ground 11), and current will flow through the right-hand side of the primary winding 12, diode D2, SCR2 and the inductor 18. Under these circumstances the left-hand end 15 of the primary winding 12 will be driven to a voltage equal to at least +2E, and the charging capacitor 24 will be charged through diode D1 to the peak voltage reached at any time during the second half cycle by the left-hand end 15 of the primary winding 12. The polarity of the commutating voltage will then be opposite to the polarity shown in FIG. 1. Again, as in the first half cycle, leakage reactance effects in the circuitry will more probably impose a short spike of voltage on the left-hand end 15 of the primary winding which will drive the peak voltage to a value in excess of +2E. If for any reason during the second half cycle the voltage at the left-hand end 15 of the primary winding 12 drops below this peak value, diode D1 will disconnect the commutating capacitor 24, leaving it charged to the peak voltage.

The purpose of the diodes D1 and D2 is to insure that commutation voltage is stored on the commutating capacitor 24 independent of the voltage wave form on the primary winding 12 of the transformer T1. These diodes maintain the commutating capacitor 24 charged to its peak voltage throughout each half cycle of the output wave, independent of the wave form across the primary winding 12 following the initial switching interval of the half cycle, as has been described above for two successive half cycles of the output wave.

FIG. 2 illustrates two full half cycles of the output wave, as it might appear across the secondary winding 13 of the transformer T1. Arbitrarily, these are shown as a positive-going half-cycle 40, and a negative-going half-cycle 41, about a medium reference level 42. Desirably, the output of the inverter is a square wave. As is indicated above, however, there are many circumstances in operation under which the voltage sags toward the end of each half cycle; this is indicated by the curved, short-dashed lines 43, 44, respectively. If the commutating voltage across the capacitor 24 is allowed to drop with this sag, as has heretofore been the practice, then reiability of the inverter circuit deteriorates in such operating circumstances. This is particularly true during turn on, since loss of commutating voltage renders switching, or turn on, erratic.

With the present invention, the commutating voltage is maintained at least as high as it would have been had the output wave been square, as is indicated at 45 and 46, respectively (i.e., without the sag indicated at 43 and 44, respectively). I have verified by experience that the diodes D1 and D2 contribute a great increase in reliability to inverter circuits of the type described. This is particularly true during turn on, in that the inverter can be reliably turned on almost independent of the degree of transformer saturation and it will much more reliably operate under adverse load conditions.

FIG. 3 shows an inverter which is the same as FIG. 1, except that silicon controlled rectifiers SCR3 and SCR4 have been substituted for diodes D1 and D2, respectively, and the inductor 18 has been omitted from FIG. 3. Parts which are alike in FIG. 1 and FIG. 3 bear the same reference characters. A trigger circut 35 is connected to apply suitable trigger voltages respectively between each control electrode 20, 21, 30, 31 and its cathode. The inverter of FIG. 3 has not only all of the improved operational features of the inverter of FIG. 1, but also additional advantages, which will be described with the aid of the output wave form illustrated in FIG. 4.

FIG. 4 shows the latter portion of a first half cycle 50 of the output wave, followed by second, third and fourth half cycles 51, 52 and 53, respectively, and the initial portion of a fifth half cycle 54, all drawn about a medium level represented by a straight line 55. The operation of the inverter of FIG. 3 may be described as follows.

Assume that the inverter is in the mid-portion of the first half cycle 50, with SCR1 and SCR3 conducting. As we have seen in connection with FIG. 1, the commutating capacitor 24 will be charged to a voltage equal to or greater than 2E, with the polarity indicated in FIG. 3, and the remaining two rectifiers SCR2 and SCR4 will be in a nonconducting state. A trigger voltage is now applied to SCR2 sufficient to cause it to become conductive. At the instant when this happens, SCR2 will attempt to clamp its anode and the right-hand side of the commutating capacitor 24 to ground 11 (i.e., to the negative side of the DC supply). In doing so, SCR2 will drive the anode of SCR1 negative with respect to its cathode, causing SCR1 to shut off. This marks the terminating edge 56 of the first half cycle 50.

The commutating capacitor 24 will, however, continue to charge through SCR3. A short time after the application of the initial trigger on SCR2, but with a delay sufficient to allow SCR1 reliably to shut off, a second trigger voltage is applied to the control electrode 31 of SCR4. This will lower the voltage at the right-hand terminal 16 of the transformer primary winding 12 effectively to the ground (or negative DC) potential (less the forward drop in SCR2 and SCR4 in series) and will simultaneously drive the left-hand end 15 of the primary winding 12 to a voltage equal at least to 2E. This event marks the start, or leading edge 57, of the second half cycle 51 of the output wave. The leading edge 57 is variable in time, as is indicated by the double-headed arrow 58, inasmuch as the trigger voltage applied to the control electrode 31 of SCR4 can be independent of the trigger voltage applied to the control electrode 21 of SCR2.

During the second half cycle 51, the commutating capacitor 24 will charge up to a commutating voltage equal at least to 2E through SCR3, which, it will be recalled, is still conducting from the first half cycle 50. The polarity of this voltage will be the reverse of the polarity shown in FIG. 3. When the commutating voltage reaches its peak value for the second half cycle 51, no further current will be able to flow through SCR3, and accordingly SCR3 will cease to conduct. The turn-off of SCR3 will be aided, or enhanced, by the unavoidable leakage reactance of the transformer T1, which will cause a small voltage transient at the end of the charging period; this transient will, in effect, reverse bias SCR3.

Reviewing the operation of FIG. 3 as thus far described, it is seen that, with SCR1 and SCR3 conducting, we are in the first half cycle 50; the first half cycle is terminated at trailing edge 56 by triggering on SCR2, which cuts off SCR1; the second half cycle 51 is started at leading edge 57 some time after the termination of the first half cycle 50, and the time interval or delay between the trailing edge 56 of the first half cycle 50 and the leading edge 57 of the second half cycle 51 is variable.

At the end of the second half cycle 51, the above-described process is repeated, by applying a trigger voltage via electrode 20 to turn on SCR1, thereby cutting off SCR2 and establishing the end of the second half cycle at the trailing edge 59; a short time later a trigger voltage is applied via electrode 30 to turn on SCR3 and initiate the leading edge 61 of the third half cycle 52. Again, the time interval or delay between the trailing edge 59 and next-following leading edge 61 is variable, as is represented by a double-headed arrow 62.

As in the inverter of FIG. 1, the inverter of FIG. 3 causes a square wave to be developed across the terminals 15 and 16 of the primary winding 12, which wave may be coupled to the load 14 through the secondary winding 13. In FIG. 3, however, the start of each half cycle can be delayed by an arbitrary time interval following the termination of the next preceding half cycle, so that the total energy content of each half cycle may thereby be regulated. In FIG. 4, the shaded portion of each half cycle represents the portion of the available time interval during which energy is being delivered to the load 14, and the unshaded portion represents the delay time interval, during which the output voltage is virtually zero. One advantage of this mode of operation of the inverter is that it is thereby relatively simple to regulate the voltage wave form delivered to the primary winding 12 of the transformer T1; this can be done simply by delaying the triggers to the auxiliary rectifiers SCR3 and SCR4 by a desired amount. Any one of a number of standard SCR trigger circuits is suitable for supplying the trigger voltages. The trigger circuit 35 shown in FIG. 3 represents any suitable circuit for his purpose.

If the load 14 is essentially resistive, it is adequate to provide narrow triggers for the various SCR's. If, however, the load is inductive, the trigger should be a rectangular wave form (e.g., as in FIG. 1) so that each SCR will be held on, or conductive, throughout its complete conduction time interval. As can be seen, there is no need for a choke, as the choke 18 in FIG. 1, for example. Thus the inverter of FIG. 3 has the further advantages of extreme simplicity, elimination of heavy chokes, and ease with which regulation of the output wave form can be provided.

Referring to FIG. 4, specifically to the trailing edge 56 of the first half cycle 50, it is noted that the trailing edge may overshoot the reference level 55; the voltage swing that occurs at this instant will very quickly recover to the reference level, as is indicated by the dotted-line overshoot spike 65. Such a spike may occur at each trailing edge; for simplicity these spikes have not been illustrated elsewhere in FIG. 4. They have no material effect upon the operation of the inverter as herein described.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. In combination, first and second terminals adapted for connection across a voltage source, a transformer having a primary winding with first and second connection points spaced apart thereon and a third connection point between them, and connected at said third point to said first terminal, first and third solid state controlled rectifier means having a first common junction between the anode of the first and the cathode of the third connected in series between said first connection point and said second terminal, second and fourth solid state controlled rectifier means having a second common junction between the anode of the second and the cathode of the fourth connected in series between said second connection point and said second terminal, and capacitor means connected between said first and second junctions.

2. In combination, first and second terminals adapted for connection across a voltage source, a transformer having a primary winding with first and second connection points spaced apart thereon and a third connection point between them, and connected at said third point to said first terminal, first solid state controlled rectifier means connected at its cathode to said second terminal, third solid state controlled rectifier means connected at its anode to said first connection point, a first common junction between the anode of said first and the cathode of said third controlled rectifier means, second solid state controlled rectifier means connected at its cathode to said second terminal, fourth solid state controlled rectifier means connected at its anode to said second connection point, a second common junction between the anode of said second and the cathode of said fourth controlled rectifier means, and capacitor means connected between said first and second junctions.

3. In combination, first and second terminals adapted for connection across a voltage source, a transformer having a primary winding with first and second connection points spaced apart thereon and a third connection point between them, and connected at said third point to said first terminal, first and third silicon controlled rectifier means having a first common junction between the anode of the first and the cathode of the third connected in series between said first connection point and said second terminal, second and fourth silicon controlled rectifier means having a second common junction between the anode of the second and the cathode of the fourth connected in series between said second connection point and said second terminal, and capacitor means connected between said first and second junctions.

4. In combination, first and second terminals adopted for connection across a voltage source, a transformer having a primary winding with first and second connection points spaced apart thereon and a third connection point between them, and connected at said third point to said first terminal, first silicon controlled rectifier means connected at its cathode to said second terminal, third silicon controlled rectifier means connected at its anode to said first connection point, a first common junction between the anode of said first and the cathode of said third controlled rectifier means, second silicon controlled rectifier means connected at its cathode to said second terminal, fourth silicon controlled rectifier means connected at its anode to said second connection point, a second common junction between the anode of said second and the cathode of said fourth controlled rectifier means, and capacitor means connected between said first and second junctions.

5. An electric inverter comprising, in combination, first and second terminals adapted for connection across a substantially unidirectional voltage source, a transformer having a primary winding with first and second connection points spaced apart thereon and a third connection point between them, and connected at said third point to said first terminal, first silicon controlled rectifier means connected at its cathode to said second terminal, third silicon controlled rectifier means connected at its anode to said first connection point, a first common junction between the anode of said first and the cathode of said third controlled rectifier means, second silicon controlled rectifier means connected at its cathode to said second terminal, fourth silicon controlled rectifier means connected at its anode to said second connection point, a second common junction between the anode of said second and the cathode of said fourth controlled rectifier means, capacitor means connected between said first and second junctions, and means sequentially to trigger said controlled rectifiers into the conductive condition in the sequence—first, third, second and fourth.

6. In combination, first and second terminals adapted for connection across a voltage source, a transformer having a primary winding with first and second ends and connected at an intermediate point to said first terminal, first solid state controlled rectifier means and first auxiliary controlled rectifier means having a first common junction and connected in series between said first end and said second terminal, second solid state controlled rectifier means and second auxiliary controlled rectifier means having a second common junction and connected in series between said second end and said second terminal, and capacitor means connected between said first and second junctions.

References Cited

UNITED STATES PATENTS 3,085,190   4/1963   Kearns et al. _____ 321—45
3,075,136   1/1963   Jones _____ 321—45

OTHER REFERENCES

G.E. "Controlled Rectifier Manual, first edition (copyright Mar. 21, 1960), pp. 138–143.

JOHN F. COUCH, *Primary Examiner.*

W. SHOOP, *Assistant Examiner.*